US012114022B2

(12) United States Patent
Grancharov et al.

(10) Patent No.: US 12,114,022 B2
(45) Date of Patent: Oct. 8, 2024

(54) IDENTIFICATION OF DECREASED OBJECT DETECTABILITY FOR A VIDEO STREAM

(71) Applicant: Telefonaktiebolaget LM Ericsson (publ), Stockholm (SE)

(72) Inventors: Volodya Grancharov, Solna (SE); Manish Sonal, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 603 days.

(21) Appl. No.: 17/285,509

(22) PCT Filed: Oct. 17, 2018

(86) PCT No.: PCT/EP2018/078362
§ 371 (c)(1),
(2) Date: Apr. 15, 2021

(87) PCT Pub. No.: WO2020/078543
PCT Pub. Date: Apr. 23, 2020

(65) Prior Publication Data
US 2021/0383117 A1   Dec. 9, 2021

(51) Int. Cl.
*G06T 7/136* (2017.01)
*G06F 18/21* (2023.01)
(Continued)

(52) U.S. Cl.
CPC ......... *H04N 19/89* (2014.11); *G06F 18/2193* (2023.01); *G06F 18/22* (2023.01);
(Continued)

(58) Field of Classification Search
CPC ..... H04N 19/89; G06F 18/2193; G06F 18/22; G06T 7/136; G06T 2207/10016;
(Continued)

(56) References Cited

U.S. PATENT DOCUMENTS 9,521,443 B2 * 12/2016 Reibman .......... H04N 21/64322
11,263,467 B2 * 3/2022 Kornienko ................ G06T 3/40
(Continued)

OTHER PUBLICATIONS

International Search Report and Written Opinion of the International Searching Authority, PCT/EP2018/078362, mailed Jun. 6, 2019, 16 pages.
(Continued)

*Primary Examiner* — Tom Y Lu
(74) *Attorney, Agent, or Firm* — Sage Patent Group

(57) ABSTRACT

There is provided mechanisms for identifying decreasing object detectability for a video stream. A method is performed by a controller. The method includes receiving the video stream over a communication channel. The method includes receiving first visual object detection (VOD) data of the video stream. The first VOD data has been obtained from the video stream before is sent over the communication channel towards the controller. The method includes obtaining second VOD data of the video stream. The second VOD data is obtained from the video stream after is received by the controller. The method includes determining, by comparing the first VOD data to the second VOD data, whether any object present in the first VOD data has a decreased object detectability in the second VOD data, thereby identifying the decreasing object detectability for the video stream. The method includes issuing a notification when the decreasing object detectability has been identified.

19 Claims, 5 Drawing Sheets

(51) Int. Cl.
| | |
|---|---|
| *G06F 18/22* | (2023.01) |
| *G06V 10/44* | (2022.01) |
| *G06V 10/54* | (2022.01) |
| *G06V 10/56* | (2022.01) |
| *G06V 10/764* | (2022.01) |
| *G06V 10/82* | (2022.01) |
| *G06V 10/98* | (2022.01) |
| *G06V 20/20* | (2022.01) |
| *G06V 20/40* | (2022.01) |
| *G06V 20/56* | (2022.01) |
| *H04N 19/89* | (2014.01) |

(52) U.S. Cl.
CPC ............ *G06T 7/136* (2017.01); *G06V 10/454* (2022.01); *G06V 10/54* (2022.01); *G06V 10/56* (2022.01); *G06V 10/764* (2022.01); *G06V 10/82* (2022.01); *G06V 10/993* (2022.01); *G06V 20/20* (2022.01); *G06V 20/40* (2022.01); *G06V 20/56* (2022.01); *G06T 2207/10016* (2013.01)

(58) Field of Classification Search
CPC . G06T 2207/20076; G06T 2207/20084; G06T 2207/30196; G06T 2207/30252; G06T 7/00; G06V 10/454; G06V 10/54; G06V 10/56; G06V 10/764; G06V 10/82; G06V 10/993; G06V 20/20; G06V 20/40; G06V 20/56
See application file for complete search history.

(56) References Cited

U.S. PATENT DOCUMENTS

| | | | | |
|---|---|---|---|---|
| 11,722,544 | B2* | 8/2023 | Agrawal | ............. H04L 65/4015 709/231 |
| 11,900,722 | B2* | 2/2024 | Han | ........................ G06N 20/00 |
| 2003/0081836 | A1* | 5/2003 | Averbuch | .................. G06T 7/12 382/199 |
| 2008/0075335 | A1* | 3/2008 | Martin | ................... G06V 40/19 382/117 |
| 2013/0194434 | A1 | 8/2013 | Krishnakumar et al. | |
| 2019/0379815 | A1* | 12/2019 | Yang | ........................ G06T 7/97 |

OTHER PUBLICATIONS

Engelke, U., et al., "Reduced-Reference Metric Design For Objective Perceptual Quality Assessment in Wireless Imaging," Signal Processing: Image Communication, Elsevier Science Publishers, Amsterdam, NL, vol. 24, No. 7, Aug. 1, 209, (XP026422550) pp. 525-547.
Martini, M.G., et al., "Robust Multilayer Control For Enhanced Wireless Telemedical Video Streaming," IEEE Transactions on Mobile Computing, vol. 9, No. 1, Jan. 1, 2010, (XP011335421) pp. 5-16.
Bubenikova, et al., "Optimisation of Video-Data Transmission in Telematic System," Advances in Electrical and Electronic Engineering, Special Issue, vol. 11, No. 2, Jan. 1, 2013, Special Issue, (XP055592320) pp. 123-134.
Kuhn, H. W., "The Hungarian Method For the Assignment Problem," Chapter 2, 50 Years of Integer Programming 1958-2008, Springer-Verlag Berlin Heidelberg 2010, pp. 29-47.
Davies, A., "Ford's Working on a Remote Control For Your Car," https://wired.com/2015/01/fords-working-remote-control-car/ 3 pages.
Hare, S. "Struck: Structured Output Tracking With Kernels," IEEE Transactions on Pattern Analysis and Machine Intelligence, vol. 38, No. 10, Oct. 2016, pp. 2096-2109.
Henriques, J. F., "High-Speed Tracking With Kernelized Correlation Filters," IEEE Transactions On Pattern Analysis And Machine Intelligence, arXiv: 1404.7584V3 [cs.CV] Nov. 5, 2014, 14 pages.
"Remotely Operate and Monitor Vehicles For Anywhere," Enabling Autonomy Through Teleoperation, https://phantom.auto/ 3 pages.
Redmon, J., et al., "YOLO9000: Better, Faster, Stronger," University of Washington, Allen Institut for AI, XNOR.ai, CVPR 2017, http://pjreddie.com/yolo9000/ 9 pages.
Ren, S., "Faster R-CNN: Towards Real-Time Object Detection With Region Proposal Networks," Microsoft Research, https://github.com/ShaogingRen/faster_rcnn 9 pages.
Wu, B., et al., "Detection and Tracking of Multiple, Partially Occluded Humans by Bayesian Combination of Edgelet Based Part Detectors," International Journal of Computer Vision,© 2007 Springer Science & Business Media, LLC, DOI: 10.1007/s11263-006-0027-7, 20 pages.
EP Art 94(3) Communication, European Patent Application No. 18789123.9, mailed Jun. 12, 2023, 5 pages.
Leszczuk, M., et al., "Assessing quality of experience for high definition video streaming under diverse packet loss patterns," Signal Processing: Image Communication, vol. 28, No. 89, Oct. 23, 2012 (XP028698271) 5 pages.

* cited by examiner

"⟵⟶" = matching objects

IDENTIFICATION OF DECREASED OBJECT DETECTABILITY FOR A VIDEO STREAM

CROSS REFERENCE TO RELATED APPLICATIONS

This application is a 35 U.S.C. § 371 national stage application of PCT International Application No. PCT/EP2018/078362 filed on Oct. 17, 2018, the disclosure and content of which is incorporated by reference herein in its entirety.

TECHNICAL FIELD

Embodiments presented herein relate to a method, a controller, a computer program, and a computer program product for identifying decreasing object detectability for a video stream.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to enable telecommuting. The term telecommuting as used herein refers to systems where a visualization, such as video frames, on a user interface at the human operator side is, over network, fed with a real-time video stream captured at a remote location, and where the human operator is enabled to, via the user interface, interact with tools at the remote location by control signals being provided over the network from the user interface at the human operator side to the tools at the remote location. The term telecommuting as herein used could thus refer to remote operation of vehicles on the one hand and remote surgery on the other hand. Remote operation of vehicles will hereinafter be given as an illustrative example, although the general concept applies equally well for other related fields, such as remote surgery, etc.

The concept of remote driving (or vehicle teleoperation) aims at making self-driving (or autonomous) vehicles safer, by providing a safety net in case of an emergency situation. This is enabled by a human operator taking control of the self-driving vehicle in case of an emergency situation. In more detail, the concept of vehicle teleoperation is that the human operator is enabled to take control, and thus steer, the vehicle in emergency situations, such as in case of traffic incidents, bad weather, etc. In this scenario a video stream as captured by a camera in the front of the vehicle is streamed to a screen at the location of the human operator. Such a system is illustrated in FIG. 1. FIG. 1 schematically illustrates a communication system 100a. According to FIG. 1 a video stream 180a of a scene comprising two objects 170a, 170b is captured by a video capturing system 150 at a vehicle 160. The video stream 180a is streamed from the vehicle 160 over a network 130 comprising a communication channel 140a, 140b towards a screen 110 at the location of the human operator 120 acting as a remote driver. Control signals 180b (such as driving commands, etc.) as based on input from the human operator 120 are fed back to the vehicle 160 over the network 130. Based on the received video stream 180a (and possibly other sensory information) the human operator 120 makes decisions and controls the vehicle 160.

One challenge in telecommuting applications requiring real-time video streaming, such as remote operation of vehicles and remote surgery, is that disturbances on one or more communication channels 140a, 140b of the network 130 might cause the video stream 180a as provided to the human operator 120 to contain visual artifacts, such as visual disturbances, distortions, or degradation, negatively impacting the image quality. Some causes for such disturbances distortions, or degradation are handovers and data rate variations. Visual impairments in the video stream 180a may lead to inability of the human operator 120 to identify important objects 170a, 170b in the scene. There are various ways to minimize the impairments caused by the disturbances on the network. However, in some use cases of telecommuting applications it is reasonable to assume that there will always be some disturbances that could cause visual impairments.

Hence, there is still a need for improved telecommuting systems.

SUMMARY

An object of embodiments herein is to provide efficient detection of objects that might be difficult to detect for a human operator. Such detection could advantageously be used to used in the above described telecommuting systems.

According to a first aspect there is presented a method for identifying decreasing object detectability for a video stream. The method is performed by a controller. The method comprises receiving the video stream over a communication channel. The method comprises receiving first visual object detection (VOD) data of the video stream. The first VOD data has been obtained from the video stream before the video stream is sent over the communication channel towards the controller. The method comprises obtaining second VOD data of the video stream. The second VOD data is obtained from the video stream after the video stream is received by the controller. The method comprises determining, by comparing the first VOD data to the second VOD data, whether any object present in the first VOD data has a decreased object detectability in the second VOD data, thereby identifying the decreasing object detectability for the video stream. The method comprises issuing a notification when the decreasing object detectability has been identified.

According to a second aspect there is presented controller for identifying decreasing object detectability for a video stream. The controller comprises processing circuitry. The processing circuitry is configured to cause the controller to receive the video stream over a communication channel. The processing circuitry is configured to cause the controller to receive first VOD data of the video stream. The first VOD data has been obtained from the video stream before the video stream is sent over the communication channel towards the controller. The processing circuitry is configured to cause the controller to obtain second VOD data of the video stream. The second VOD data is obtained from the video stream after the video stream is received by the controller. The processing circuitry is configured to cause the controller to determine, by comparing the first VOD data to the second VOD data, whether any object present in the first VOD data has a decreased object detectability in the second VOD data, thereby identifying the decreasing object detectability for the video stream. The processing circuitry is configured to cause the controller to issue a notification when the decreasing object detectability has been identified.

According to a third aspect there is presented a controller for identifying decreasing object detectability for a video stream. The controller comprises a receive module configured to receive the video stream over a communication channel. The controller comprises a receive module configured to receive first VOD data of the video stream. The first VOD data has been obtained from the video stream before the video stream is sent over the communication channel towards the controller. The controller comprises an obtain module configured to obtain second VOD data of the video stream. The second VOD data is obtained from the video stream after the video stream is received by the controller. The controller comprises a determine module configured to determine, by comparing the first VOD data to the second VOD data, whether any object present in the first VOD data has a decreased object detectability in the second VOD data, thereby identifying the decreasing object detectability for the video stream. The controller comprises an issue module configured to issue a notification when the decreasing object detectability has been identified.

According to a fourth aspect there is presented a computer program for identifying decreasing object detectability for a video stream, the computer program comprising computer program code which, when run on a controller, causes the controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

According to a sixth aspect there is presented a system for identifying decreasing object detectability for a video stream. The system comprises the controller according to any of the second or third aspect. The video stream originates from a video capturing system. The first VOD data has been obtained by the controller from the video stream as captured at the video capturing system. The system further comprises the video capturing system.

Advantageously this method, this controller, this computer program, this computer program product, and this system provide efficient detection of objects that, when the video stream has been sent over a communication channel, might be difficult to detect for a human operator.

Advantageously the notification enables the human operator to take measures or perform remote operation of tools at the remote location wherefrom the video stream originates, as appropriate for the situation.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

Figure 1:
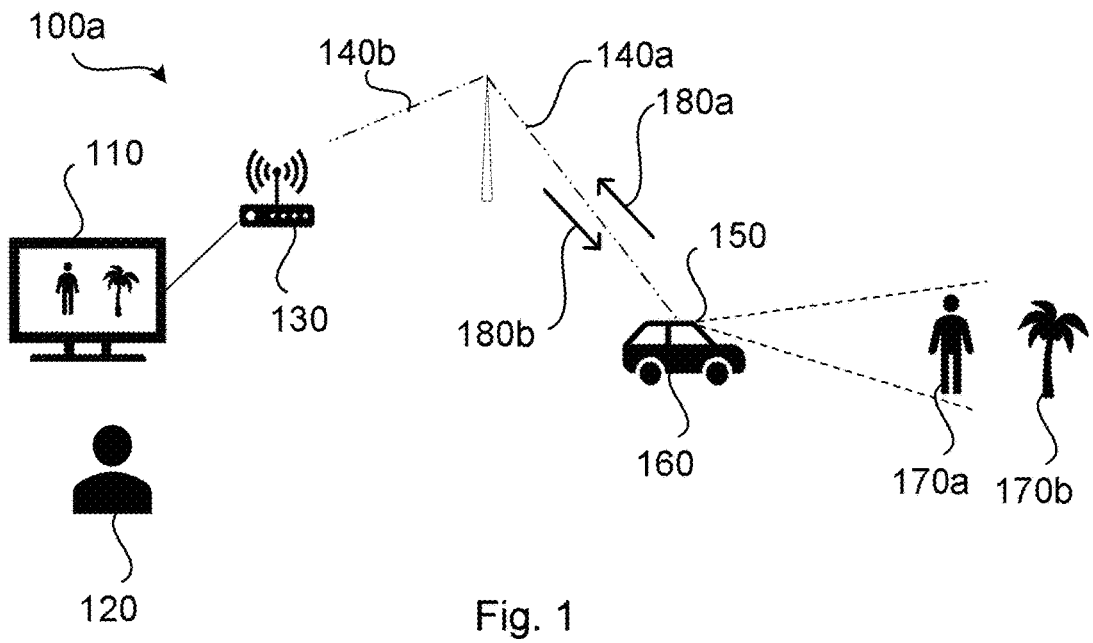
FIG. 1 is a schematic diagram illustrating a communication system according to prior art.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

As noted above, disturbances on one or more communication channels 140a, 140b of the network 130 might cause the video stream 180a as provided to the human operator 120 to contain visual artifacts. As further noted above, visual impairments in the video stream 180a may lead to inability of the human operator 120 to identify important objects 170a, 170b in the scene. It could therefore be beneficial to have a warning system that indicates to the human operator 120 that detectability of important objects may be decreasing due to video quality issues.

The embodiments disclosed herein therefore particularly relate to mechanisms for identifying decreasing object detectability for a video stream. In order to obtain such mechanisms there is provided a controller 200, a method performed by the controller 200, a computer program product comprising code, for example in the form of a computer program, that when run on a controller 200, causes the controller 200 to perform the method.

The warning system is based on using visual object detection (VOD) before as well as after transmission of the video stream 180a over the communication channel 140a, 140b.

Figure 2:
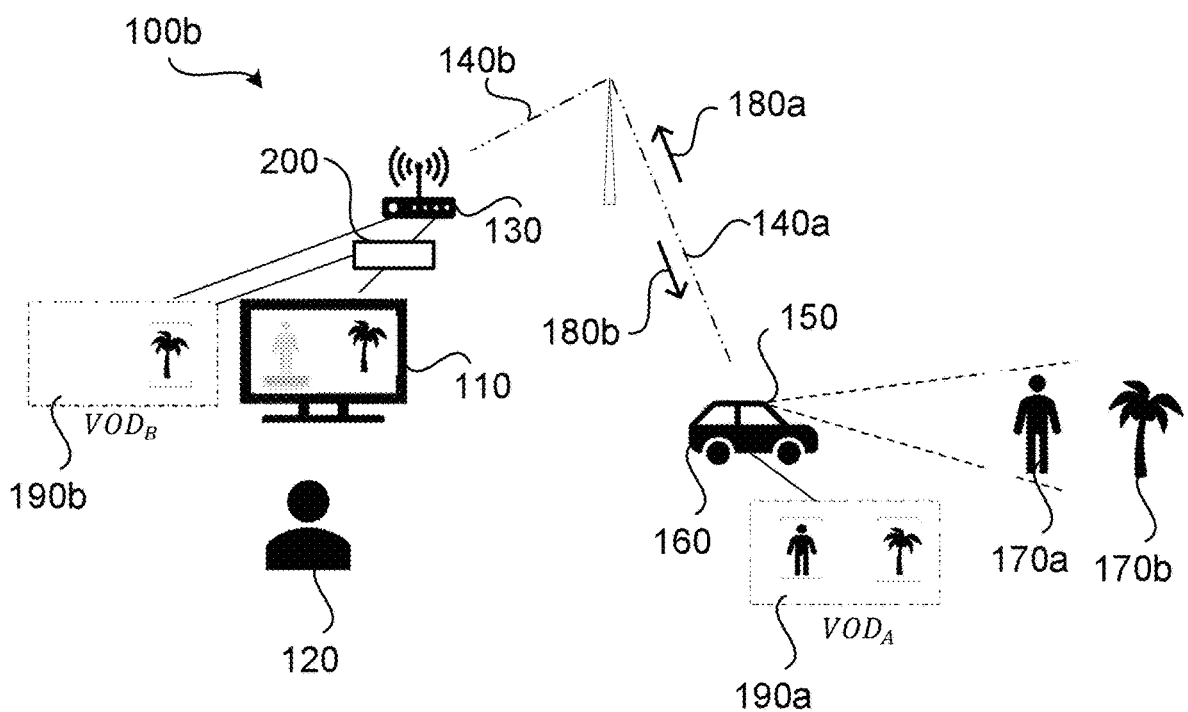
FIG. 2 is a schematic diagram illustrating a communication system according to embodiments.

FIG. 2 is a schematic diagram illustrating a communication system 100b where embodiments presented herein can be applied. The communication system 100b is similar to the communication system 100a of FIG. 1 and thus illustrates a scenario, where a video stream 180a of a scene comprising two objects 170a, 170b is captured by a video capturing system 150 at a vehicle 160. The video stream 180a is streamed from the vehicle 160 over a network 130 comprising a communication channel 140a, 140b towards a screen 110 at the location of the human operator 120 acting as a remote driver. Control signals 180b (such as driving commands, etc.) as based on input from the human operator 120 are fed back to the vehicle 160 over the network 130. In addition thereto, two equivalent VOD detectors 190a, 190b are provided; VOD detector 190a is configured to obtain first VOD data at the vehicle 160 (i.e., to obtain VOD data from the video stream 180a before it is transmitted over the communication channel 140a, 140b); and VOD detector 190b is configured to obtain second VOD data at the screen 110 (i.e., to obtain VOD data from the video stream 180a after it is received over the communication channel 140a, 140b). The VOD detectors 190a, 190b run simultaneously.

As noted above, disturbances on one or more communication channels 140a, 140b of the network might cause the video stream 180a as provided to the human operator to contain visual artifacts. Hence, the communication channel 140a, 140b might be referred to as a lossy communication channel. Due to visual impairments caused by transmission of the video stream 180a over the network 130 and possibly due to codec parameters, the VOD detector 190b operating on the thus streamed video stream 180a will likely have lower detection probabilities of the objects 170a, 170b in comparison to the VOD detector 190a operating in the vehicle 160 directly on the captured video stream 180a. This is in FIG. 2 schematically illustrated by the object 170a being missing in the VOD detector 190b. In this respect, the video stream 180a from which the first VOD data is obtained is thus considered free of distortions, while the video stream 180a from which the second VOD data is could possible be impaired by disturbances on the communication channel 140a, 140b. As will be further disclosed below, a controller 200 is configured to use the outputs of the VOD detectors 190a, 190b (i.e., the first VOD data and the second VOD data) to determine whether the human operator 120 needs to be alerted of possible detectability issues due to varying network conditions.

Figure 3:
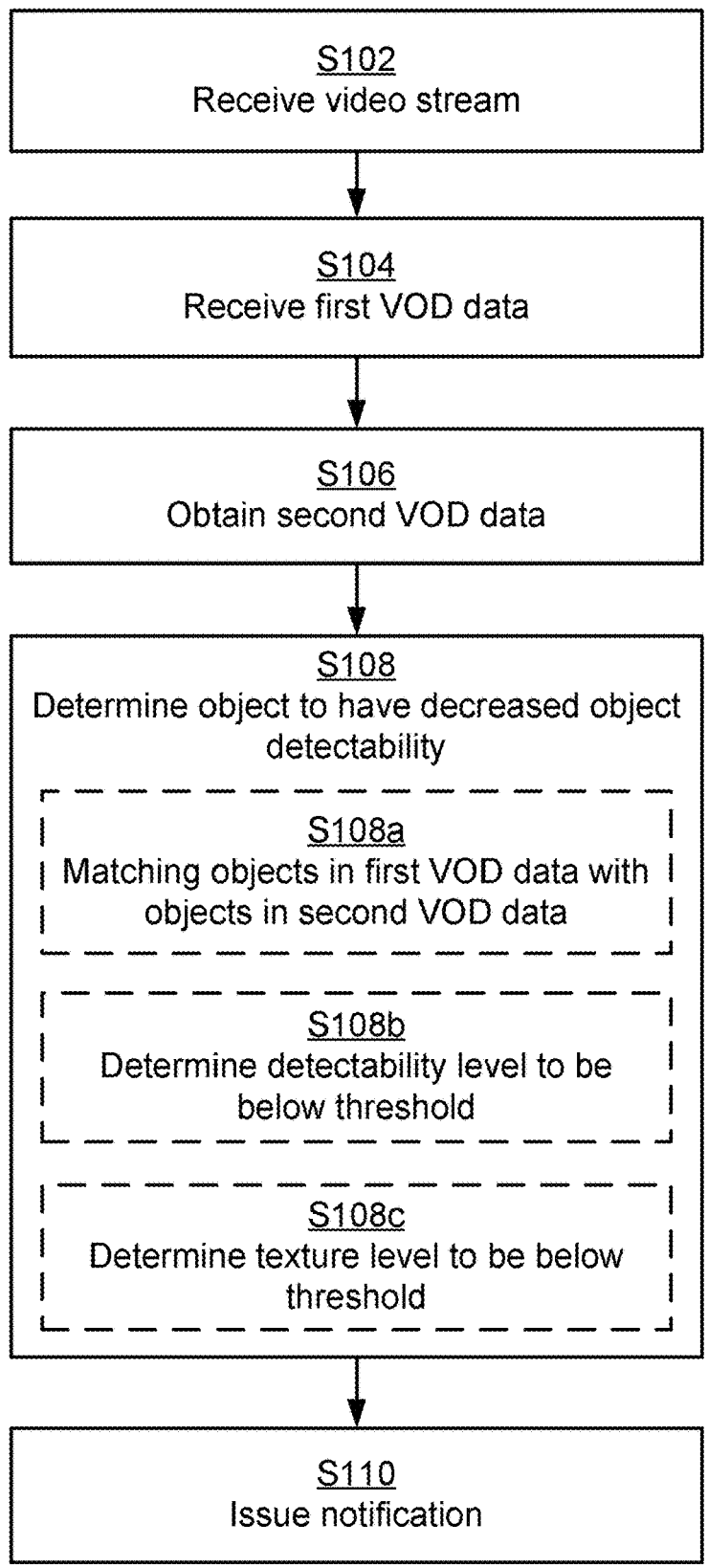
FIG. 3 is a flowchart of methods according to embodiments.

FIG. 3 is a flowchart illustrating embodiments of methods for identifying decreasing object detectability for a video stream 180a. The methods are performed by the controller 200. The methods are advantageously provided as computer programs 820.

It is assumed that VOD is performed on the video stream 180a before the video stream 180a is sent towards the controller 200. It is further assumed that the controller 200 receives the video stream 180a as well as the result of the VOD, as above referred to as first VOD data. Hence, the controller 200 is configured to perform steps S102 and S104:

S102: The controller 200 receives the video stream 180a over a communication channel 140a, 140b.

S104: The controller 200 receives first VOD data of the video stream 180a. The first VOD data has been obtained from the video stream 180a before being sent over the communication channel 140a, 140b towards the controller 200.

The controller 200 further performs VOD on the thus received video stream 180a. Particularly, the controller 200 is configured to perform step S106:

S106: The controller 200 obtains second VOD data of the video stream 180a. The second VOD data is obtained from the video stream 180a after being received by the controller 200.

The controller 200 then determines if the video stream 180a suffers from any visual impairments. This is achieved by comparing the second VOD data with the first VOD data. Particularly, the controller 200 is configured to perform step S108:

S108: The controller 200 determines, by comparing the first VOD data to the second VOD data, whether any object present in the first VOD data has a decreased object detectability in the second VOD data. The controller 200 thereby identifies the decreasing object detectability for the video stream 180a.

Decreasing object detectability for the video stream 180a thus indicates that the video stream 180a suffers from visual impairments. A notification is therefore issued. Particularly, the controller 200 is configured to perform step S110:

S110: The controller 200 issues a notification when the decreasing object detectability has been identified.

For example, the decreasing object detectability might represent visual degradations that are likely to cause impact on the ability of the human operator to accurately analyze the scene represented by the video stream 180a. For example, the decreasing object detectability might cause the operator to miss an important object in the scene. The notification could therefore serve as a warning for the human operator.

Embodiments relating to further details of identifying decreasing object detectability for a video stream 180a as performed by the controller 200 will now be disclosed.

There may be different sources of the video stream 180a. On example is given in FIG. 2 where the video stream 180a originates from a video capturing system 150. Further, in accordance with the illustrative example of FIG. 2, the first VOD data is obtained (by a VOD detector) where the video stream 180a is captured. Thus, according to an embodiment, the first VOD data has by the controller 200 been obtained from the video stream 180a as captured at the video capturing system 150. For example, the first VOD data could be obtained by the VOD detector 190a.

Further, also in accordance with the illustrative example of FIG. 2, the second VOD data is obtained (by a VOD detector 190b) from the video stream 180a to be presented for visualization. Particularly, according to an embodiment, the second VOD data is obtained by the controller 200, from the video stream 180a as to be sent to a screen 110 for visualization.

There may be different options as how often the first and second VOD data should be obtained. In general terms, the VOD detectors operate on a frame-by-frame basis. Particularly, according to an embodiment, each of the first VOD data and the second VOD data is frame-wise obtained from video frames in the video stream 180a.

There may be different ways to represent the first and second VOD data. Particularly, according to an embodiment, each object in the first VOD data and each object in the second VOD data is represented by a respective tuple. In some examples each tuple comprises: an object type field, a detection probability field, a bounding box field, and a video frame number field. According to a non-limiting example, each object O is represented as:

$$O=\{ID^m, P^m, B^m, n\}_{m=1}^M$$

Here, ID is a value in the object type field and might represent a class ID (object type), like "car", "pedestrian", etc. P is a value in the detection probability field and might represent the detection probability, i.e., how certain is the VOD that an object of certain class is detected. B is a value in the bounding box field and might represent the location of the object in the video frame. The bounding box is typically parametrized by four coordinates, corresponding to the center coordinates (x,y), width (w), and height (h) of a box around the object, thus B={x,y,w,h}. The video frame number is indicated by the value of n (as present in the video frame number field), and the index m indicates that there might be M candidate objects (region proposals) in the current frame n.

Since there are two VOD detectors, their respective outputs are denoted by:

$$O_A = \{ID_A^m, P_A^m, B_A^m, n\}_{m=1}^M$$

$$O_B = \{ID_B^m, P_B^m, B_B^m, n\}_{m=1}^{\tilde{M}}$$

There could be different examples of VOD detectors. In some aspects the VOD detectors 190a, 190b are Convolutional Neural Network (CNN) based detectors operating in real-time on the video frames.

Further, in some aspects the VOD detectors 190a, 190b have been trained on application specific VOD data of the same application type as the VOD data to be obtained from the video stream 180a. That is, according to an embodiment, each of the first VOD data and the second VOD data is application specific VOD data.

There could be different examples of application specific VOD data. In some non-limiting examples the application specific VOD data relates to a remote vehicle driving application or a remote surgery application. Hence, in the first example, the VOD detectors could have been trained to identify vehicles, pedestrians, etc., whereas in the second case the VOD detectors could have been trained to identify blood vessels, tissue, organs, bone structure, etc. Hence, the above noted so-called important object could be a vehicle, pedestrian, blood vessel, tissue, organ, bone structure, etc. depending on the application in which the method for identifying decreasing object detectability for the video stream 180a is used.

As noted above, the first VOD data is passed on to the controller 200 along with the video stream 180a. In case of bandwidth limitations the first VOD data might be a reduced set of the total set of VOD data as obtained from the captured video stream 180a. Particularly, according to an embodiment, the controller 200 only receives a proper subset of all first VOD data obtained from the video stream 180a before being sent over the communication channel 140a, 140b. For example instead of transmitting all first VOD data obtained from the video stream 180a, only the first VOD data with highest detection probability P might be selected for transmission to the controller 200. Thus, in some aspects the VOD detectors 190a, 190b also perform thresholding of detection probabilities of the proposed to produce the actual first VOD data and second VOD data.

Figure 4:
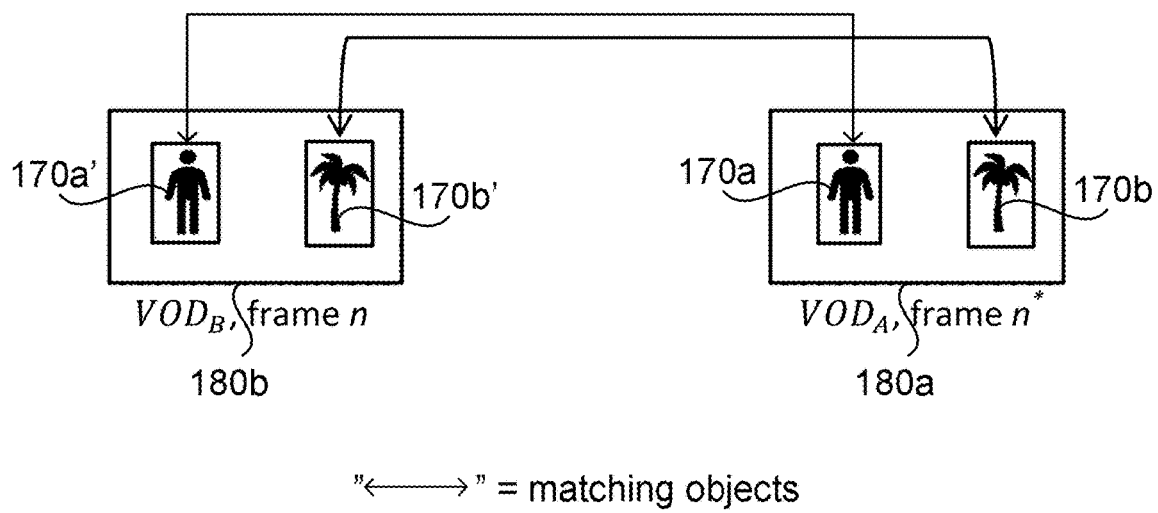
FIG. 4 schematically illustrates object matching according to an embodiment.

In some aspects data association is performed for objects in the first VOD data and objects in the second VOD data. Intermediate parallel reference is here made to FIG. 4. FIG. 4 schematically illustrates an example of data association where each object 170a, 170b in the first VOD data is associated with a respective object 170a', 170b' in the second VOD data. Objects 170a, 170b in the first VOD data are thereby connected to objects 170a', 170b' in the second VOD data. Particularly, according to an embodiment, the controller 200 is configured to perform (optional) step S108a as part of step S108:

S108a: The controller 200 matches objects 170a, 170b in the first VOD data with objects 170a', 170b' in the second VOD data. In some aspects the matching is based on matching objects 170a', 170b' in the second VOD data having similar locations (e.g. defined by having close spatial coordinates as defined by the above parameter B) in the video frames as objects 170a, 170b in the first VOD data. In some aspects the matching is based on matching texture or colour of objects 170a', 170b' in the second VOD data to texture or colour of objects 170a, 170b in the first VOD data. In some aspects the matching is based on matching the probability of detection of objects 170a', 170b' in the second VOD data to the probability of detection of objects 170a, 170b in the first VOD data. Combinations are also possible (e.g., to match objects based on a combination of location, texture or colour, and probability of detection).

In general terms, it might be that the first VOD data representing a certain video frame $n_1$ has not yet arrived at the controller 200 when the first VOD data for this video frame $n_1$ is to be compared to the second VOD data for this video frame $n_1$. In this case the controller 200 could either wait for the first VOD data representing video frame $n_1$ or perform the comparison for the latest-most received first VOD data, which may be extracted from frame video frame $n_1-1$, etc. Thus, also VOD data in video frames surrounding video frame $n_1$ might be used. Particularly, according to an embodiment, when comparing the first VOD data to the second VOD data, the first VOD data of a given video frame is compared to the second VOD data of same frame number as well as to the second VOD data in video frames surrounding the video frame of the same frame number.

There could be different ways to perform the data association, and thus to perform the matching in step S108a. In some aspects the data association, and thus the matching in step S108a, is performed using the so-called Hungarian algorithm, or using a less complex greedy search, which iteratively connects the related objects in the first VOD data and the objects in the second VOD data.

For the sake of notation, it is assumed that there are only two objects (with index m=1, 2) detected in each of the frames and they are associated as follows, where for simplicity the object type field and frame number value are omitted:

$$O_A = \{\{P_A^1, B_A^1\}, \{P_A^2, B_A^2\}\}$$

$$O_B = \{\{P_B^1, B_B^1\}, \{P_B^2, B_B^2\}\}$$

In some aspects, the detection probabilities of the corresponding objects are used to estimate a detectability level. Particularly, according to an embodiment, the controller 200 is configured to perform (optional) step S108b as part of step S108:

S108b: The controller 200 determines that a detectability level for said any object in the second VOD data is below a detectability threshold value e.

The detectability level is determined on a per-object basis.

There could be different ways to determine the detectability level. According to an embodiment, the detectability level is determined from a detection probability for said any object in the first VOD data and a detection probability for said any object in the second VOD data. Hence, according to an example, and using the assumption above of only two objects being detected the detection probabilities take the form:

$$D^1 = f(P_A^1, P_B^1)$$

$$D^2 = f(P_A^2, P_B^2)$$

There could be different examples of how to implement the mapping f( ).

In one example:

$$D = \left(\frac{P_B}{P_A + P_B}\right)^\beta$$

where β is a compression factor (β<1) adjusted for the particular VOD application. In another example:

$$D = \max(P_B - P_A, 0).$$

Furthermore, any measure of the texture, or structure (like variance, entropy, etc.) of regions of interest could be calculated and compared to identify loss of texture relative to the original scene. This could be indicative of decreased object detectability. Particularly, according to an embodiment, the controller 200 is configured to perform (optional) step S108c as part of step S108:

S108c: The controller 200 determines that a texture level for a region of interest in a video frame of the video stream 180a obtained over the communication channel 140, 140b is below a texture threshold value.

The texture level might be determined from a measure of texture of the region of interest in a video frame of the video stream 180a before being sent over the communication channel 140a, 140b towards the controller 200 and a measure of texture of the region of interest in a video frame of the video stream 180a obtained over the communication channel 140a, 140b.

There could be different ways to define the region of interest. In some aspects the region of interest is defined by the spatial location in the video frame of the object in the first VOD data for which the object detectability in the second VOD data is decreased. Particularly, according to an embodiment, the region of interest is defined by said any object present in the first VOD data.

As an example, if standard deviation σ of pixels in the region of interest is used to identify the decreasing object detectability, the mappings from the above will take the form:

$$D^1 = f(\sigma_A^1, \sigma_B^1)$$

$$D^2 = f(\sigma_A^2, \sigma_B^2)$$

In some aspects the detectability level D is then used as an indicator of decreasing object detectability. For example, the decreasing object detectability for the video stream 180a might be identified if the detectability level for a particular object is below a threshold Θ:

$$\text{if } \underset{\text{perform visual alert for object "j"}}{D^j < \Theta}$$

Further, a combination of probability of detection and measure of texture in regions of interest could be used to identify the decreasing object detectability. For example, the decreasing object detectability could be based on a weighted sum of the probability of detection and the measure of texture in regions of interest. Alternatively, the probability of detection and the measure of texture are associated with independent threshold values and decreasing object detectability is then only identified when the probability of detection is below a first threshold value and the measure of texture is below a second threshold value.

There could be different types of notifications issued in step S110. In some aspects the notification is given as a visual alert that highlights a region in the video frame where the decreasing object detectability has been identified. Particularly, according to an embodiment, the notification is provided as a bounding box surrounding a region of interest in a video frame of the video stream 180a to be sent to the screen 110 for visualization. Additionally, or alternatively, the notification might be provided together with information from a motion model, or from a visual object tracker to indicate direction of movement and/or extrapolate position of the thus highlighted region of interest. As above, the region of interest might be defined by said any object present in the first VOD data. A warning could thus, by means of the issued notification, be given to the human operator 120. The warning could be given as, or be accompanied by, highlighting of the region of interest, for example as a bounding box around, and/or visualizing of the expected trajectory of, the object.

Figure 5A:
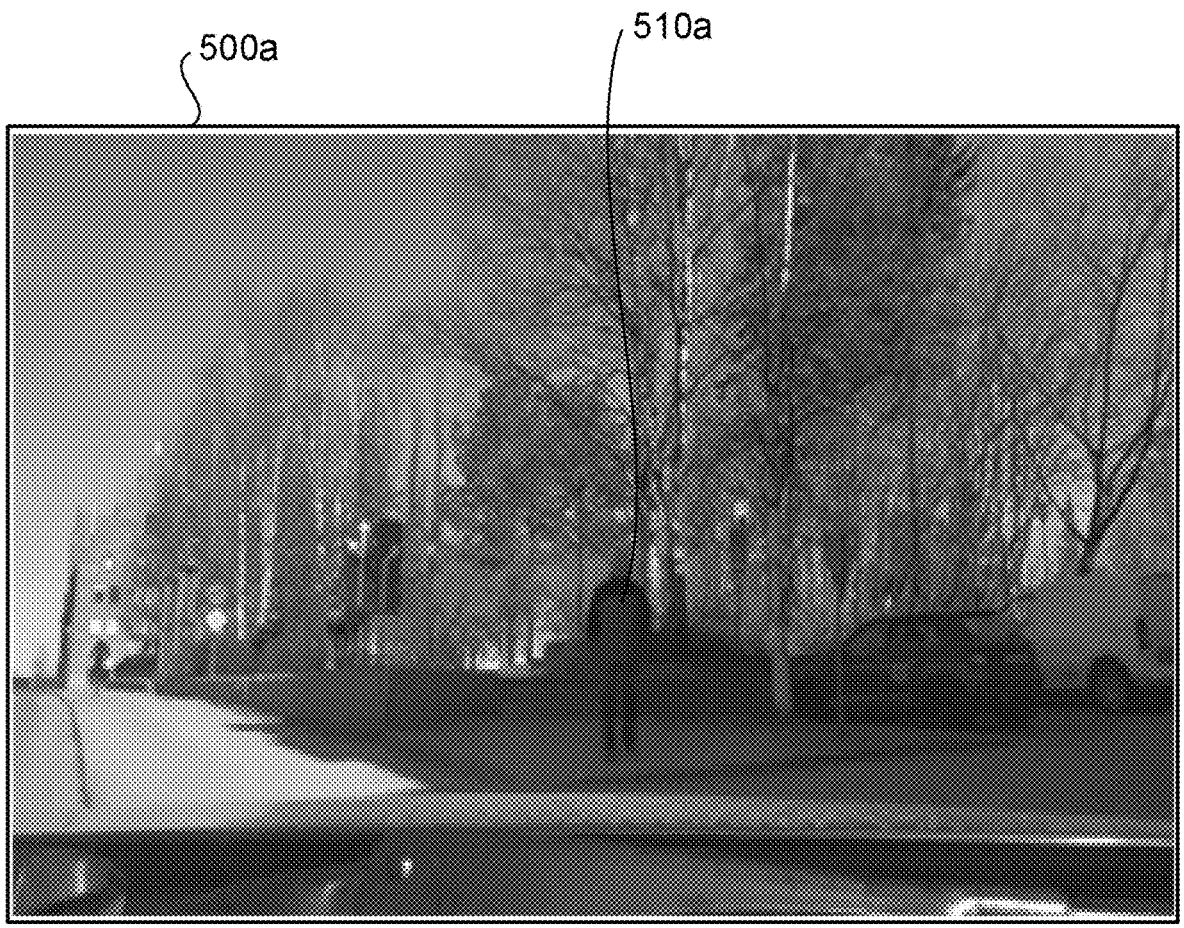
FIG. 5 schematically illustrates decreasing object detectability according to an embodiment.
Figure 5B:
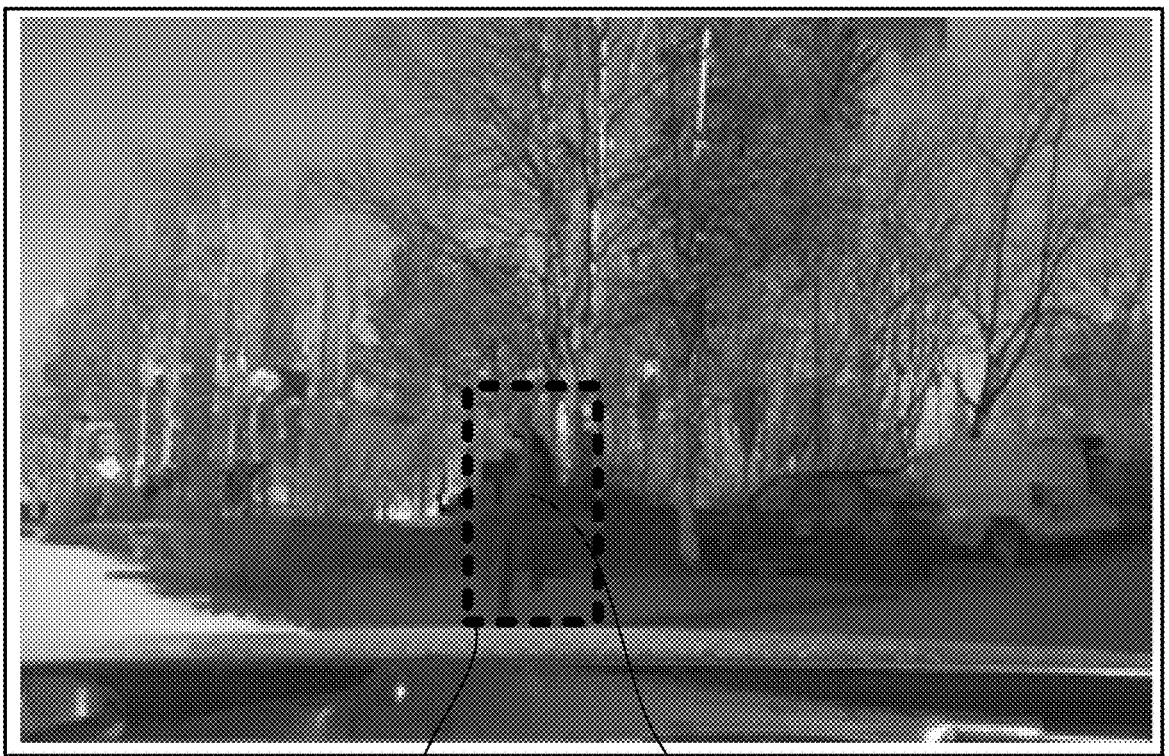
Figure 5C:
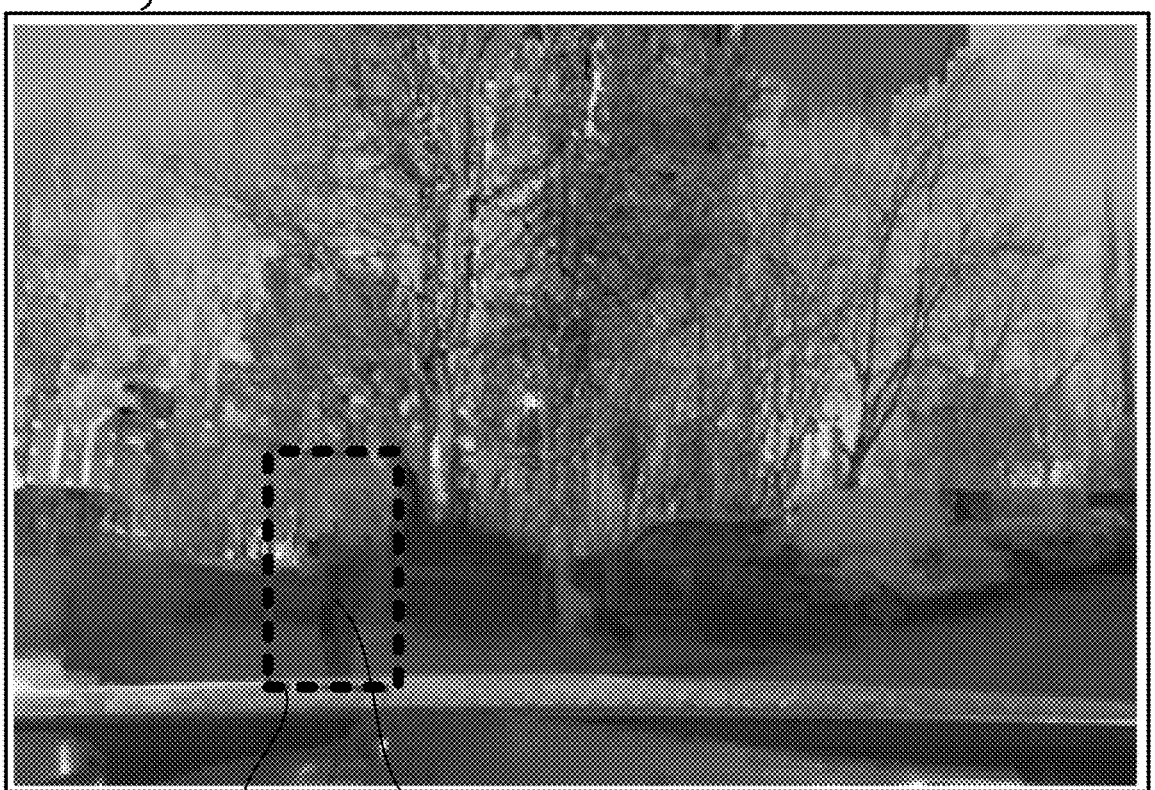

FIGS. 5(a), 5(b), 5(c) give an illustrative example of a sequence of video frames 500a, 500b, 500c where an object 510a, 510b, 510c as represented by a pedestrian has progressively decreasing detectability. In FIG. 5(a) the object 510a is visible and thus the pedestrian easy to detect; in FIG. 5(b) the detectability of the object 510b, and thus of the pedestrian, decreases and a bounding box 520a is provided as a warning; and in FIG. 5(c) the object 510c is unrecognizable and thus the detectability of the pedestrian is zero and a bounding box 520b is provided as a warning.

Figure 6:
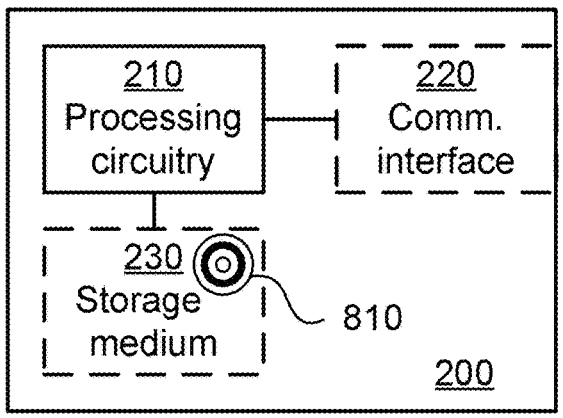
FIG. 6 is a schematic diagram showing functional units of a controller according to an embodiment.

FIG. 6 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with other devices, functions, nodes, entities, and systems. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

Figure 7:
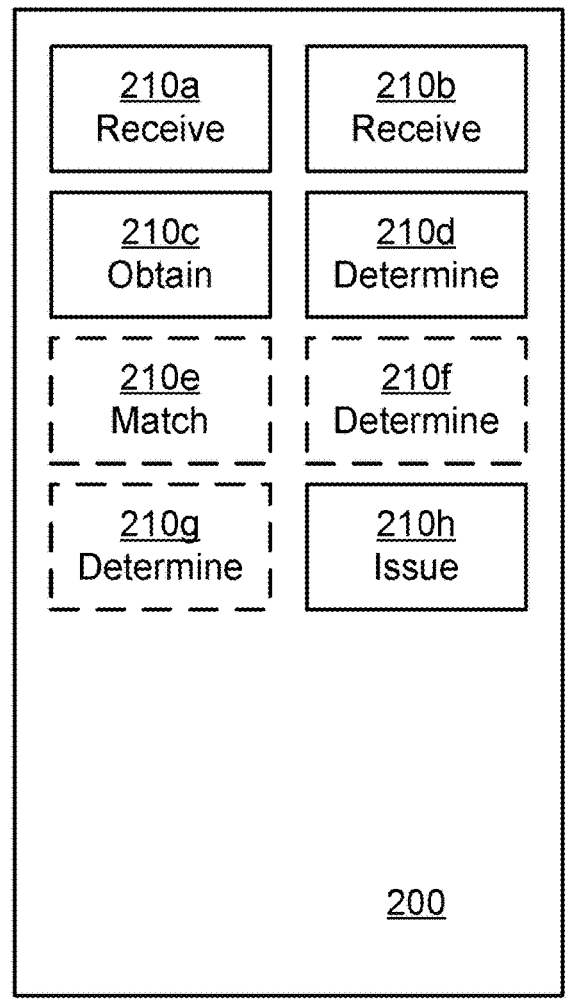
FIG. 7 is a schematic diagram showing functional modules of a controller according to an embodiment.

FIG. 7 schematically illustrates, in terms of a number of functional modules, the components of a controller 200 according to an embodiment. The controller 200 of FIG. 7 comprises a number of functional modules; a receive module 210a configured to perform step S102, a receive module 210b configured to perform step S104, an obtain module 210c configured to perform step S106, a determine module 210d configured to perform step S108, and an issue module 210h configured to perform step S110. The controller 200 of FIG. 7 may further comprise a number of optional functional modules, such as any of a match module 210e configured to perform step S108a, a determine module 210f configured to perform step S108b, and a determine module 210g configured to perform step S108c.

In general terms, each functional module 210a-210h may in one embodiment be implemented only in hardware and in another embodiment with the help of software, i.e., the latter embodiment having computer program instructions stored on the storage medium 230 which when run on the processing circuitry makes the controller 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with the communications interface 220 and/or the storage medium 230. The processing circuitry 210 may thus be configured to from the storage medium 230 fetch instructions as provided by a functional module 210a-210h and to execute these instructions, thereby performing any steps as disclosed herein.

The controller 200 may be provided as a standalone device or as a part of at least one further device. Alternatively, functionality of the controller 200 may be distributed between at least two devices, or nodes. Thus, a first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 210 is illustrated in FIG. 6 the processing circuitry 210 may be distributed among a plurality of devices, or nodes. The same applies to the functional modules 210a-210h of FIG. 7 and the computer program 820 of FIG. 8.

Further, in some aspects the controller 200 is part of a system. Hence, in some aspects there is presented a system for identifying decreasing object detectability for a video stream 180a. The system comprises the controller 200 and a video capturing system 150 having captured the video stream 180a, and where the first VOD data has been obtained by the controller 200 from the video stream 180a as captured at the video capturing system 150. In some aspects the system further comprises the above defined VOD detectors 190a, 190b.

Figure 8:
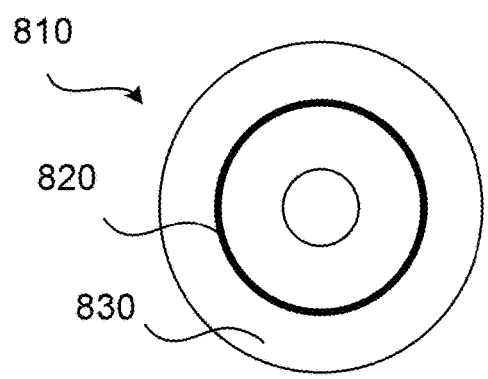
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for identifying decreasing object detectability for a video stream, the method being performed by a controller, the method comprising:
    receiving the video stream over a communication channel;
    receiving first visual object detection, VOD, data of the video stream, wherein the first VOD data has been obtained from the video stream before being sent over the communication channel towards the controller, wherein the first VOD data includes a first detection probability value;
    obtaining second VOD data of the video stream, wherein the second VOD data is obtained from the video stream after being received by the controller, wherein the controller receives a subset of all first VOD data obtained from the video stream before being sent over the communication channel, wherein the subset is selected based on a bandwidth limitation of the communication channel, wherein the second VOD data includes a second detection probability value;
    determining, by comparing the first VOD data to the second VOD data, whether at least one object present in the first VOD data has a decreased object detectability in the second VOD data, thereby identifying the decreasing object detectability for the video stream, wherein comparing the first VOD data to the second VOD data includes utilizing one or more of the first detection probability value and the second detection probability value to determine a detectability level for the at least one object and wherein the identifying the decreasing object detectability includes determining that the detectability level is below a detectability threshold value; and
    issuing a notification when the decreasing object detectability has been identified.

2. The method according to claim 1, wherein said determining comprises:
    matching objects in the first VOD data with objects in the second VOD data.

3. The method according to claim 1, wherein said determining comprises:
    determining that a detectability level for said any object in the second VOD data is below a detectability threshold value.

4. The method according to claim 3, wherein the detectability level is determined from a detection probability for said any object in the first VOD data and a detection probability for said any object in the second VOD data.

5. The method according to claim 1, wherein said determining comprises:
  determining that a texture level for a region of interest in a video frame of the video stream obtained over the communication channel is below a texture threshold value.

6. The method according to claim 5, wherein the texture level is determined from a measure of texture of the region of interest in a video frame of the video stream before being sent over the communication channel towards the controller and a measure of texture of the region of interest in a video frame of the video stream obtained over the communication channel.

7. The method according to claim 1, wherein each of the first VOD data and the second VOD data is frame-wise obtained from video frames in the video stream.

8. The method according to claim 7, wherein when comparing the first VOD data to the second VOD data, the first VOD data of a given video frame is compared to the second VOD data of same frame number as well as to the second VOD data in video frames surrounding the video frame of said same frame number.

9. The method according to claim 1, wherein each object in the first VOD data and each object in the second VOD data is represented by a respective tuple, each tuple comprising: an object type field, a detection probability field, a bounding box field, and a video frame number field.

10. The method according to claim 1, wherein each of the first VOD data and the second VOD data is application specific VOD data.

11. The method according to claim 10, wherein the application specific VOD data relates to a remote vehicle driving application or a remote surgery application.

12. The method according to claim 1, wherein the communication channel is a lossy communication channel.

13. A controller for identifying decreasing object detectability for a video stream, the controller comprising:
  a receive module configured to receive the video stream over a communication channel;
  a receive module configured to receive first visual object detection, VOD, data of the video stream, wherein the first VOD data has been obtained from the video stream before being sent over the communication channel towards the controller, wherein the first VOD data includes a first detection probability value;
  an obtain module configured to obtain second VOD data of the video stream, wherein the second VOD data is obtained from the video stream after being received by the controller, wherein the controller receives a subset of all first VOD data obtained from the video stream before being sent over the communication channel, wherein the subset is selected based on a bandwidth limitation of the communication channel, wherein the second VOD data includes a second detection probability value;
  a determine module configured to determine, by comparing the first VOD data to the second VOD data, whether any object present in the first VOD data has a decreased object detectability in the second VOD data, thereby identifying the decreasing object detectability for the video stream, wherein comparing the first VOD data to the second VOD data includes utilizing one or more of the first detection probability value and the second detection probability value to determine a detectability level for the at least one object and wherein the identifying the decreasing object detectability includes determining that the detectability level is below a detectability threshold value; and
  an issue module configured to issue a notification when the decreasing object detectability has been identified.

14. A system for identifying decreasing object detectability for a video stream, the system comprising the controller according to claim 13, wherein the video stream originates from a video capturing system, wherein the first VOD data has been obtained by the controller from the video stream as captured at the video capturing system, and wherein the system further comprises the video capturing system.

15. A controller for identifying decreasing object detectability for a video stream, the controller comprising processing circuitry, the processing circuitry being configured to cause the controller to:
  receive the video stream over a communication channel;
  receive first visual object detection, VOD, data of the video stream, wherein the first VOD data has been obtained from the video stream before being sent over the communication channel towards the controller, wherein the first VOD data includes a first detection probability value;
  obtain second VOD data of the video stream, wherein the second VOD data is obtained from the video stream after being received by the controller, wherein the controller receives a subset of all first VOD data obtained from the video stream before being sent over the communication channel, wherein the subset is selected based on a bandwidth limitation of the communication channel, wherein the second VOD data includes a second detection probability value;
  determine, by comparing the first VOD data to the second VOD data, whether any object present in the first VOD data has a decreased object detectability in the second VOD data, thereby identifying the decreasing object detectability for the video stream, wherein comparing the first VOD data to the second VOD data includes utilizing one or more of the first detection probability value and the second detection probability value to determine a detectability level for the at least one object and wherein the identifying the decreasing object detectability includes determining that the detectability level is below a detectability threshold value; and
  issue a notification when the decreasing object detectability has been identified.

16. The controller according to claim 15, wherein the video stream originates from a video capturing system, and wherein the first VOD data has been obtained from the video stream as captured at the video capturing system.

17. The controller according to claim 15, wherein the second VOD data is obtained from the video stream as to be sent to a screen for visualization.

18. The controller according to claim 17, wherein the notification is provided as a bounding box surrounding a region of interest in a video frame of the video stream to be sent to the screen for visualization.

19. The controller according to claim 18, wherein the region of interest is defined by said any object present in the first VOD data.

* * * * *